June 30, 1970   W. J. SMYTHE   3,518,010
COLORIMETER

Filed March 3, 1967   2 Sheets-Sheet 1

INVENTOR.
WILLIAM J. SMYTHE
BY
ATTORNEY

June 30, 1970 — W. J. SMYTHE — 3,518,010
COLORIMETER
Filed March 3, 1967 — 2 Sheets-Sheet 2
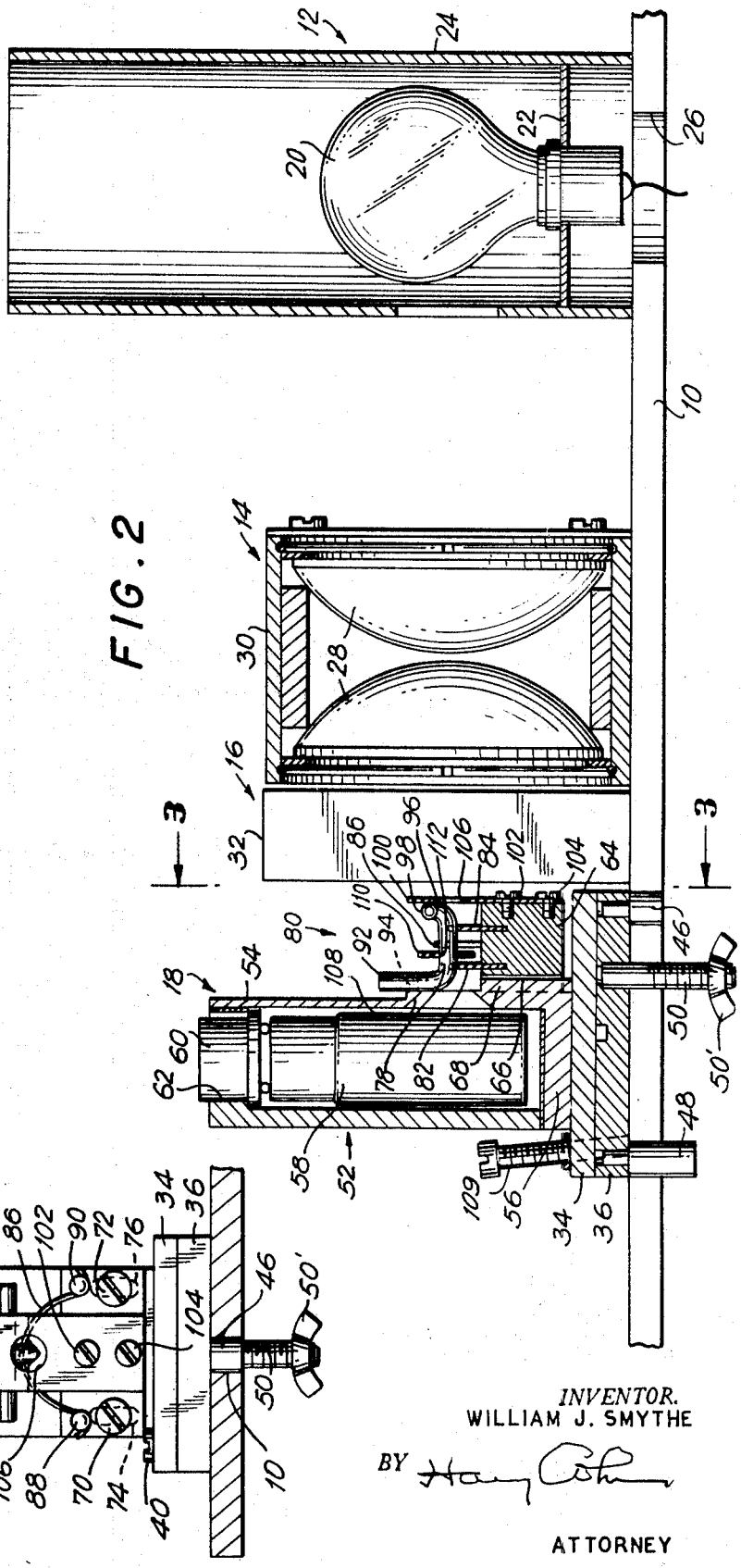
INVENTOR.
WILLIAM J. SMYTHE
BY Harry Cohen
ATTORNEY

United States Patent Office 3,518,010
Patented June 30, 1970

1

3,518,010
COLORIMETER
William J. Smythe, Rye, N.Y., assignor to Technicon Corporation, a corporation of New York
Filed Mar. 3, 1967, Ser. No. 620,484
Int. Cl. G01j 3/46; G01n 1/10, 21/06
U.S. Cl. 356—181     3 Claims

ABSTRACT OF THE DISCLOSURE

A colorimeter comprises a light source, a light detector, and a flow cell having an elongated sight passageway; and for the purpose of precluding the passage of stray light from the source to the detector does not have an entrance aperture between the light source and the light inlet end of the sight passageway, but has a light baffle means encircling the sight passageway intermediate its light inlet and outlet ends.

BACKGROUND OF THE INVENTION

Field of the invention

This invention relates to colorimeters, and particularly to an optical system therefor which is well adapted to the analysis of samples of small volume.

Description of the prior art

A colorimeter which is adapted to the analysis of samples of small volume is shown in U.S. Pat. No. 3,236,602, issued to Jack Isreeli on Feb. 22, 1966; and U.S. Pat. No. 3,241,431, issued to Leonard T. Skeggs et al. on Mar. 22, 1966. This colorimeter has, on a common axis, a light source, a light focusing means, a light entrance aperture, a sight passageway of a flow cell, an exit aperture, a filter, and a light detector. While the filter is therein shown to be disposed between the exit aperture and the detector, a filter may be disposed between the focusing means and the entrance aperture as shown in U.S. Pat. No. 3,046,831, issued to Jack Isreeli on July 31, 1962.

In evaluating the performance of colorimeters, several characteristics are of major significance. They may be identified as (1) power, (2) linearity, and (3) wash.

(1) Power is defined as the total light energy at the detector. It may be measured and reported as millivolts across the load resistor of the detector.

(2) Linearity is defined in terms of conformance with Beer's law, i.e., concentration is proportional to optical density. Good linearity means that concentration is proportional to optical density. Fair and poor linearity respectively mean a deviation from Beer's law to a lesser and greater extent.

(3) Wash is here defined as that time in seconds that the colorimeter output signal for a sample is at steady state during a sixty second sample time. Wash-in is a condition of successive samples wherein the preceding sample has a low concentration and the succeeding sample has a high concentration. Wash-out is a condition of successive samples wherein the preceding sample has a high concentration and the succeeding sample has a low concentration.

Linearity is affected by chemical and optical factors. Beer's law may be true for only a limited range of optical density as provided by a particular chemical reaction. Limiting the chemistry to the linear optical density range will avoid this effect. Optical nonlinearity may be caused by variations in monochromaticity and by stray light. Monochromaticity may be held constant by using the same filter and condenser system.

One source of stray light may originate from an inadequate shielding of the detector which allows ambient light to fall on the light-sensitive element of the detector. If the power measured at the detector with the colorimeter lamp off is less han 0.1% of the power with the lamp on, the detector may be considered to be adequately shielded.

Another source of stray light is that light which originates at the colorimeter lamp and does not pass through the sample on its way to the detector. It may pass around the sight passageway of the flow cell.

It has been classical practice that an entrance aperture is placed in front of the flow cell. This is done to preclude stray light from getting around the outside of the flow cell and into the detector. An exit aperture has additionally been used to help bar stray light. Entrance apertures have always been made smaller than the internal diameter of the sight passageway. This was done to preclude light entering the glass wall portion of the sight passageway and to preclude light getting around the outside of the glass and into the detector. In practice, the flow cells are glued into plastic holders which have integral entrance and exit apertures.

SUMMARY

It is an object of this invention to provide an optical system for a colorimeter having greatly increased power for a given light source.

A feature of this invention is the provision of an optical system for a colorimeter including a light source, a flow cell, a light detector and light baffle closely encircling the sight passageway of the flow cell intermediate its ends, thereby blocking the passage of light from the light source, around the outside of the sight passageway, to the light detector.

BRIEF DESCRIPTION OF THE DRAWING

These and other objects, features and advantages of the invention will be apparent from the following specification thereof when taken in conjunction with the accompanying drawing in which:

FIG. 2 is a top view of the flow cell and detector assembly of FIG. 1; and

FIG. 3 is a front view in elevation of the assembly of FIG. 2.

DESCRIPTION OF THE PREFERRED EMBODIMENT

Figure 1:
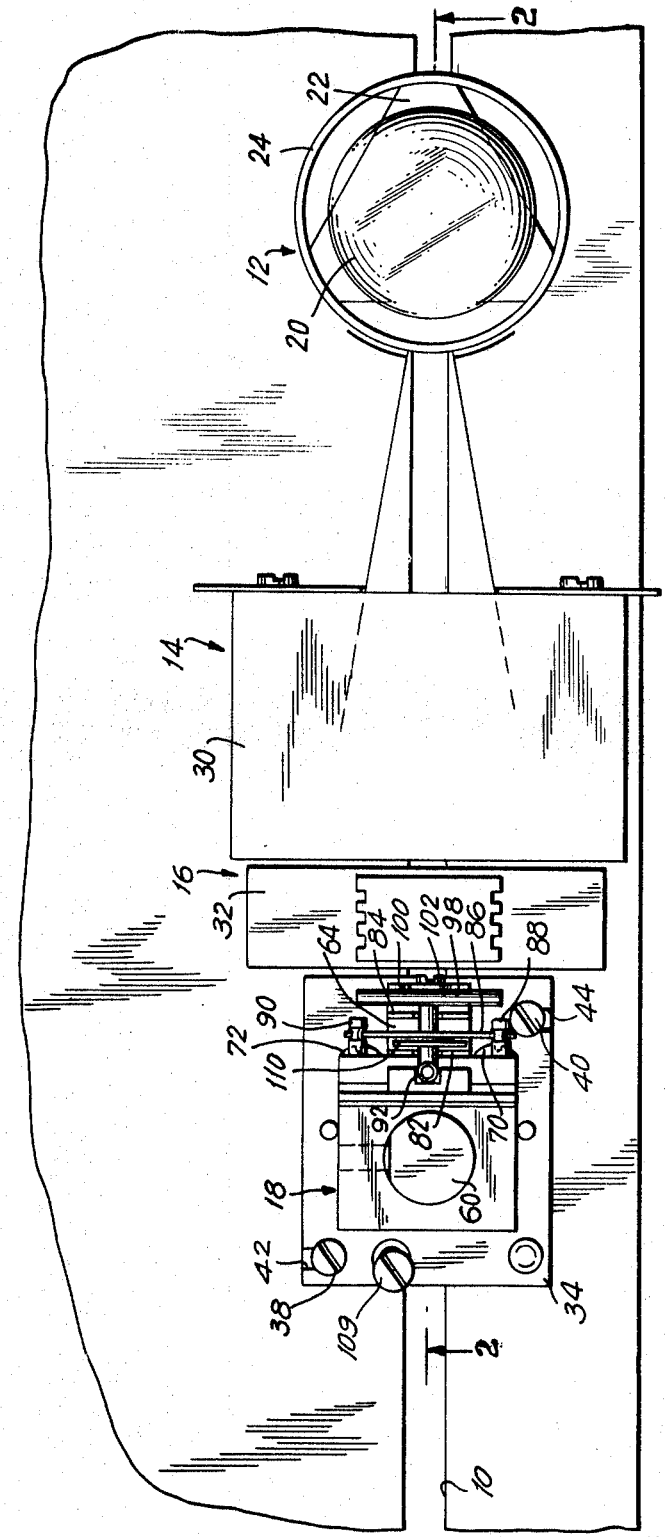
FIG. 1 is a side view in elevation, partly in cross-section of an optical system for a colorimeter embodying this invention.

The optical system of the colorimeter comprises an optical bench or track 10, a lamp assembly 12, a light focusing means 14, a filter means 16 and a flow cell and a light detector assembly 18.

The lamp assembly 12 includes a lamp 20 disposed in a socket 22 in a chimney 24 over an aperture 26 in the bench 10.

The light focusing means 14 includes a pair of plano-convex lenses 28 disposed in a housing 30, for focusing light from the lamp on the flow cell.

The filter assembly 16 includes a housing 32 having frames therein for supporting a plurality of filters for limiting the light from the lamp to a predetermined wave length. The lamp assembly, the light focusing means and the filter assembly form a monochromator.

The flow cell and detector assembly 18 comprises two base plates 34 and 36 which are mounted together by a pair of machine screws 38 and 40 passing through slots 42 and 44 respectively in plate 34 into threaded holes in plate 36 to provide a limited amount of relative movement transverse to the optical axis. Two dowels 46 and 48, and a threaded stud 50 are fixed to the lower plate 36, and pass through a central slot in the bench 10. A detector housing 52 has a front wall 54 and a base 56 integral therewith and secured to the upper plate 34; and rear and side walls and a top secured to the front wall. A phototube 58 is mounted to a socket 60 which is secured into a bore 62 through the top of the housing. A flow cell support block 64 is mounted on the front wall 54 for vertical relative movement therewith by a vertical groove 66 which receives a mating tongue 68 which is integral with the front wall 54. A pair of machine screws 70 and 72 passing through respective slots 74 and 76 in the block 64 into threaded bores on the front wall 54 fix the block to the front wall. The sight passageway 78 of a flow cell 80 is disposed in two V-notches respectively formed into two upstanding plates 82 and 84 which are fixed in the block 64. A spring clip 86 passes over the sight passageway and, at each curved end thereof, under a respective post 88 and 90 which are fixed to the block 64. The left end of the sight passageway of the flow cell herein shown continues into an upstanding outlet portion 92 which is disposed within a groove 94 formed into the tongue portion 68 of the front wall 54 of the detector housing. The right end of the sight passageway continues into an upstanding portion 96 which forms the leg of a T-shaped junction with a conduit portion 98. An upstanding flat retaining spring 100 is fixed to the block 64 by two machine screws 102 and 104 and its upper end presses against the T-shaped portion of the flow cell. An aperture 106 is formed through the upper end of the spring 100.

A cone shaped aperture 108 is formed through the front wall 54 of the detector housing, coaxial with the light axis of the focusing means 14.

A machine screw 109 is disposed in a threaded bore through the base plate 34 and an enlarged bore in the base plate 36 to bear against the top of the optical bench. advancing this screw will provide a tilt to the assembly 18. A wing nut 50' is mounted on the stud 50 to clamp the assembly 18 in any desired position.

The block 64 is adjusted, if necessary, so that the aperture 106, the sight passageway 78 and the aperture 108 are coaxial with the light axis of the focusing means 14. The diameters of the apertures 106 and 108 are made at least as large as the internal diameter of the sight passageway, and are here shown to be larger than the external diameter of the sight passageway. A plate 110 is immediately disposed on and closely encircles the sight passageway, and extends radially at least beyond the aperture 106. The plate advantageously may be made of rubber with an aperture 112 which is slightly smaller than the external diameter of the sight passageway, whereby the plate may be readily mounted on the flow cell and will tightly encircle the sight passageway. Light passing through the aperture 106 will be precluded by the plate 110 from passing through the aperture 108 unless such light passes through the flow cell.

The aperture 108 is made cone shaped and the phototube 58 is disposed as close to the end of sight passageway as possible, so that the phototube subtends as large an arc as is possible of the light exiting from the sight passageway.

I have found that the relative position and size of the entrance aperture of the flow cell, here aperture 106, has a pronounced effect on the power. The larger the aperture, the higher the power. The intermediate light baffle, here plate 110, prevents stray light from getting into the detector regardless of the size and position of the entrance aperture. In fact, removing the entrance aperture completely does not affect the linearity and does increase the power, e.g. by 65%. I have found that light is leaving the end of the sight passageway of flow cell at large angles and, therefore, the detector should be placed as close to this end as possible and should have a reasonably large sensitive area, thereby to subtend as large a cone of light as possible.

The advantage of middle shielding without entrance and exit apertures, or with enlarged apertures, as here shown, are:

(1) Stray light to the detector is greatly reduced.
(2) Power from the detector is maximized.
(3) Construction of the flow cell holder is simplified, and alignment adjustments are much less critical.
(4) Flow cells with internal diameters smaller than two millimeters can be conveniently used; thus providing improved wash; since the smaller the diameter, the better the wash.

While there has been shown and described a presently preferred embodiment of the invention, it will be understood that the invention may be embodied otherwise than as herein specifically illustrated or described and that in the illustrated embodiment certain changes in the details of construction and in the form and arrangement of parts may be made without departing from the underlying idea or principles of the invention. Accordingly, the invention is not limited to the prior construction shown or described herein, except as may be required by the scope of the appended claims.

What is claimed is:

1. A colorimeter comprising a flow cell having an elongated sight passageway:
    light source means disposed adjacent one end of said sight passageway for transmitting light into said one end of said sight passageway;
    light detector means disposed adjacent the other end of said sight passageway for receiving light from said other end of said sight passageway; and
    a plate-like light baffle disposed around said flow cell intermediate the ends thereof in tightly embracing relation in a plane normal thereto for precluding the passage of light from said light source means to said light detector means along a path external to said sight passageway.

2. A colorimeter according to claim 1 further including means providing a nominal entrance aperture for said one end of said sight passageway, the internal diameter of said entrance aperture being at least as large as the external diameter of said one end of said sight passageway.

3. A colorimeter according to claim 2 further including means providing a nominal exit aperture for said other end of said sight passageway, the internal diameter of said exit aperture being at least as large as the external diameter of said other end of said sight passageway.

(References on following page)

References Cited

UNITED STATES PATENTS

| | | |
|---|---|---|
| 1,914,937 | 6/1933 | Bodine. |
| 3,177,706 | 4/1965 | Shuman et al. |
| 3,244,776 | 4/1966 | Sheldon. |
| 3,273,447 | 9/1966 | Frank _____ 350—96 |
| 3,289,527 | 12/1966 | Gilford et al. |
| 3,307,447 | 3/1967 | Carleton et al. |
| 3,332,316 | 7/1967 | Saunders. |
| 3,345,910 | 10/1967 | Rosin et al. |
| 1,785,392 | 12/1930 | Sawford et al. _____ 356—207 |
| 1,785,393 | 12/1930 | Sawford _____ 356—207 |
| 2,624,012 | 12/1952 | English et al. _____ 356—207 |
| 2,812,686 | 11/1957 | Sinclair _____ 356—103 |

FOREIGN PATENTS 919,759 2/1963 Great Britain.

OTHER REFERENCES

Smith, B. L.: "Optical Cell . . .," Rev. of Sci. Inst., vol. 34, No. 1, January 1963, pp. 19–21.

Burns, E. A.: "Heater Infrared Gas Cell," Analyt. Chem., vol. 35, No. 8, July 1963, pp. 1106–1107.

RONALD L. WIBERT, Primary Examiner

W. A. SKLAR, Assistant Examiner

U.S. Cl. X.R.

250—218; 356—208, 246